United States Patent

[11] 3,629,812

| [72] | Inventor | Ernest J. Amato<br>Nutley, N.J. |
|---|---|---|
| [21] | Appl. No. | 824,823 |
| [22] | Filed | May 15, 1969 |
| [45] | Patented | Dec. 21, 1971 |
| [73] | Assignee | Walter Kidde & Company, Inc.<br>Belleville, N.J. |

[54] TURBULENCE-COMPENSATED ULTRASONIC INTRUDER DETECTOR
7 Claims, 3 Drawing Figs.

[52] U.S. Cl. .................................................... 340/1 R, 340/258 A
[51] Int. Cl. .................................................... G01s 9/66
[50] Field of Search ........................................ 340/1, 3, 3 D, 258; 343/5 PD

[56] References Cited
UNITED STATES PATENTS
2,794,974 6/1957 Bagno et al. .................. 340/1 UX
2,972,133 2/1961 MacDonald .................. 340/3 D Primary Examiner—Richard A. Farley
Attorney—Darby & Darby ABSTRACT: An ultrasonic intruder detector including a transmitter for radiating sound energy into a space, a receiver for receiving reflected sound energy, and a modulator for beating the transmitted and received signals to produce a doppler frequency signal, a filter for eliminating the doppler signals having a frequency below 15 cycles and passing the doppler signals in a higher frequency range, a differential amplifier having first and second amplifier circuits connected to a common input and having their outputs balanced against each other, a pair of oppositely poled diodes connected to one of the amplifier circuits to unbalance these circuits when the amplitude of one of the higher range signals exceeds a predetermined level, and a sensitivity control for adjusting the level of the higher range signals resulting from air turbulence to a value less than the predetermined level so that no output is produced in response to doppler signals resulting turbulence.

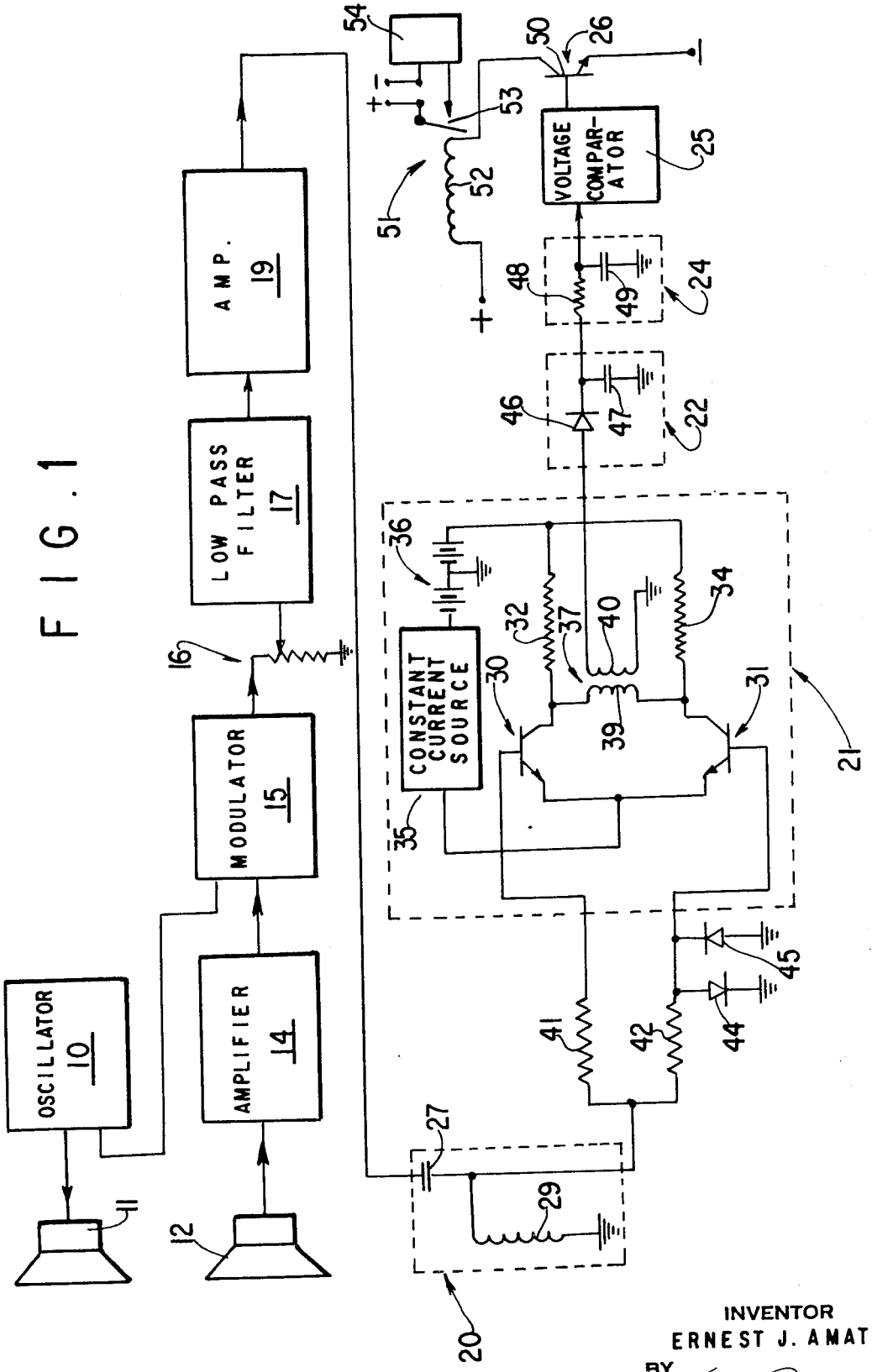

TURBULENCE-COMPENSATED ULTRASONIC INTRUDER DETECTOR

BACKGROUND OF THE INVENTION

The present invention relates to intruder detection systems which respond to changes in the frequency of a transmitted signal as a result of reflection from a moving body.

In such systems energy, such as high-frequency sound waves, is transmitted into the space to be protected. The walls defining the space and objects within the space reflect the energy waves and the reflected waves are received and compared with the transmitted waves. If no motion occurs in the protected space, the received energy will have the same frequency as the transmitted energy. If there is movement within the space the frequency of the received energy is changed by its reflection from the moving object due to the doppler effect. Motion in the space is detected by beating the transmitted energy against the received energy in a modulator to produce a signal which has a frequency equal to the difference in frequency between the transmitted and received energy. The low-frequency signal thus produced, if there is movement within the space, is referred to as the doppler frequency signal and is used to actuate an alarm.

In systems using sound energy, a change in frequency also occurs when the transmitted sound waves pass through moving air. These modified waves are subsequently reflected from walls or from objects within the space and thus form part of the received energy. Such normal air turbulences as those occurring because of the presence of a heated radiator, a fan, or an air conditioner within the space produce a doppler frequency signal which will initiate a false alarm unless the effects of turbulence are compensated for by the system.

SUMMARY

Accordingly, it is an object of the present invention to provide an improved ultrasonic intruder detector including means for eliminating the effects of air turbulence.

Another object is to provide a novel means for eliminating the effects of air turbulence which is simple, practical, and economical.

These objects are accomplished by providing in a detection system which includes means for radiating energy of a given frequency into a space to be modified in frequency by disturbances in the space, means for receiving frequency-modified energy reflected from objects within the space, and means for producing doppler signals containing only frequencies equal to the difference between the frequency of the radiated energy and the frequencies of the received energy; means for eliminating the effects of air turbulence comprising filter means for eliminating those doppler signals within a lower frequency range and passing those doppler signals within a higher frequency range, means for adjusting the level of the higher frequency range signals resulting from air turbulence in the space to a value less than a predetermined level, and amplitude-responsive means for producing an output to actuate an alarm only when the higher frequency signals have an amplitude above the predetermined level.

BRIEF DESCRIPTION OF THE DRAWING

A preferred embodiment of the invention has been chosen for purposes of illustration and description, as is shown in the accompanying drawings, forming a part of the specification, wherein:

FIG. 1 of the drawing is a schematic diagram of an intruder detector system incorporating turbulence compensating means in accordance with the present invention.

Figure 3:
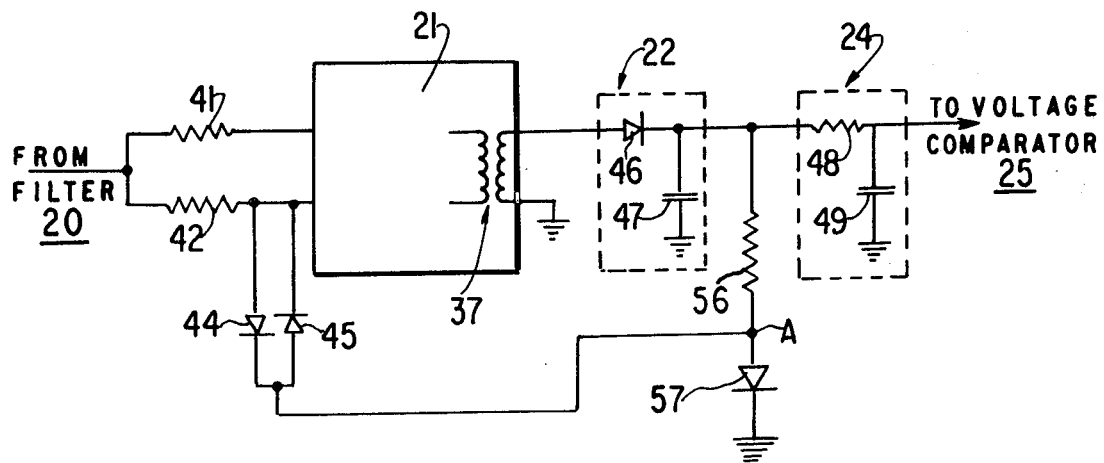

Referring to the FIG. 1 in detail, there is shown an intruder detector system which includes an oscillator 10, a transmitting transducer or speaker unit 11, a receiving transducer or pickup unit 12, an amplifier 14, a modulator 15, a sensitivity control potentiometer 16, a low-pass filter 17, a low-frequency amplifier 19, a band-pass filter 20, a differential amplifier 21, a detector 22, an integrator 24, a voltage comparator 25, and an alarm circuit 26.

The oscillator 10 produces an output signal having a frequency equal to 19,200 cycles per second which drives the speaker 11 to radiate ultrasonic sound energy of the same frequency into the area to be protected. The sound energy reflects from walls and objects within the area and is received by the pickup unit 12 to be converted into an electrical signal having the frequencies of the received sound energy. The output of the pickup unit 12 is amplified in the amplifier 14 and is beat against the oscillator frequency in the modulator 15. The modulator output contains each of the input frequencies, a frequency equal to the sum of the input frequencies, and a frequency equal to the difference of the input frequencies.

The low-pass filter 17 passes the difference frequency signal and rejects the input frequencies and the sum frequency.

If there is no movement within the protected area, the energy received by the pickup unit 12 has the same frequency as that transmitted by the speaker unit 11, then there is no difference frequency signal.

If however there is movement within the protected area, the received energy contains a doppler frequency change and a doppler frequency signal is present at the output of the filter 17.

Figure 2:
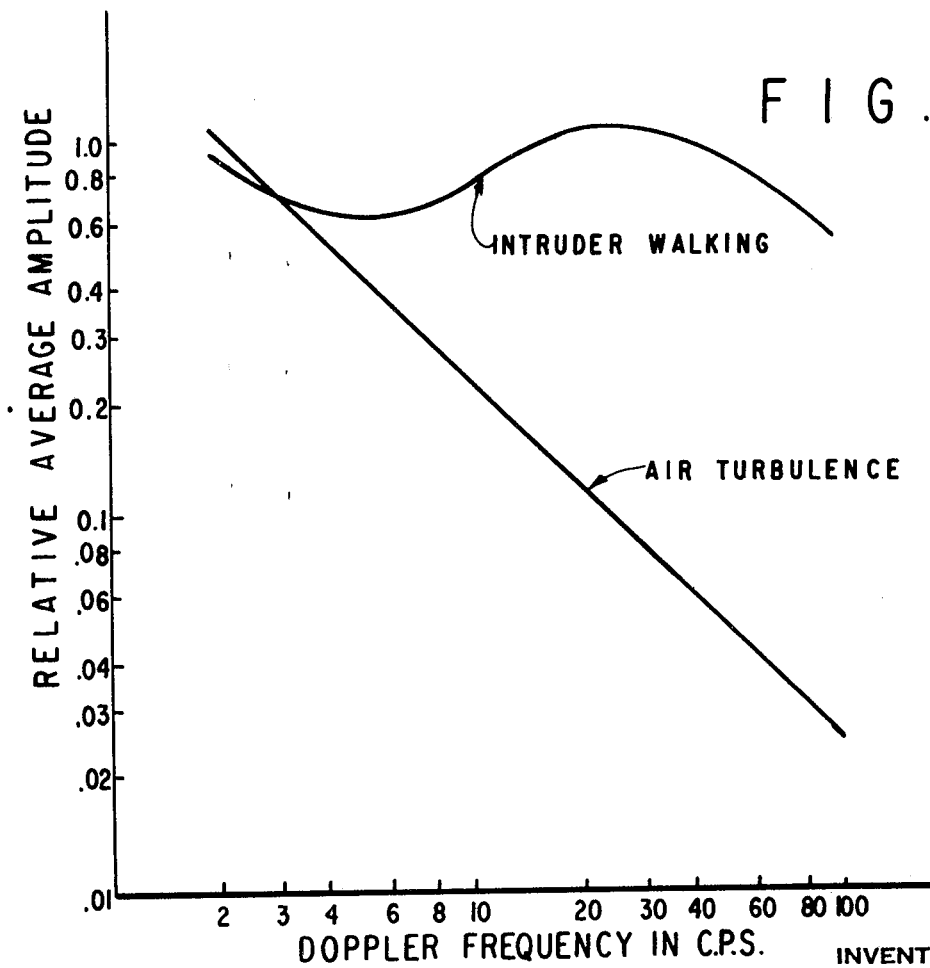
FIG. 2 is a graphic representation of the amplitude-frequency relationship of doppler signals produced by a walking intruder and by air turbulence.

It has been found that the doppler frequency signals produced by air turbulence contain a range of frequencies extending from about 2 cycles per second to above 100 cycles per second. As shown in FIG. 2, the amplitude of these signals decrease rapidly as the frequency increases.

The doppler frequency signals are amplified by the low-frequency amplifier 19 and are fed into the band-pass filter 20. The filter 20, which includes a capacitor 27 and a choke 29, passes signals above approximately 15 cycles and rejects lower frequencies, therefore, of those doppler signals produced by turbulence, only the low-amplitude higher frequency signals appear at the output of the filter 20.

The doppler signals produced by a walking man contain a range of frequencies between 2 and 100 cycles per second and, as shown IN FIG. 2, are relatively uniform in amplitude throughout this range. Therefore, when an intruder is present, doppler signals of a substantial amplitude appear at the output of the filter 20.

The output of the filter 20 is fed into the differential amplifier 21. The amplifier 21 includes a pair of transistors 30 and 31, a resistor 32 having one end connected to the collector of the transistor 30, and a resistor 34 having one end connected to the collector of the transistor 31. The emitters of the transistors 30 and 31 are connected together and a constant current source 35 is connected between the emitters and the negative terminal of a direct current source 36. The other ends of the resistors 32 and 34 are interconnected and connected to the positive terminal of the source 36. The source 36 has an intermediate terminal connected to electrical ground so that the negative terminal thereof is below ground potential. An output transformer 37 has its primary winding 39 connected between the collectors of the transistors 30 and 31 and has its secondary winding 40 connected to the detector. The bases of the transistors 30 and 31 are respectively connected through resistors 41 and 42 to the output of the filter 20.

The resistors 32 and 34 are of equal value, the transistors 30 and 31 are matched and the resistors 41 and 42 are of equal value so that the amplifier 21 consists of two amplifying circuits of equal characteristics having their outputs balanced one against the other. When both of the transistors 30 and 31 are fed by signals of equal amplitude and phase, the amplifier is said to have a common mode input and produces no output. When the transistors are fed by signals which are different in phase or amplitude, the amplifier is said to have a differential mode input and an output is produced.

A pair of oppositely poled diodes 44 and 45 are connected between the base of the transistor 31 and electrical ground to provide dissimilar signals to the transistors in response to large amplitude doppler signals.

The diodes 44 and 45 have a threshold value of about 0.7 volts. When the doppler signal at the output of the filter 20 is below that value the bases of the two transistors receive equal input signals of the same phase so that the collectors thereof always have equal potentials and the amplifier 21 produces no output.

When the unit is installed, the sensitivity of the system is adjusted by means of the sensitivity control potentiometer 16 in accordance with the air turbulence present in the protected area. With no motion in the protected area other than that of the turbulent air, the potentiometer 16 is utilized to adjust the amplitude of the doppler signal appearing at the base of each of the transistors to a value somewhat below the threshold value of the diodes. The amplifier 21 produces no output in response to signals of this amplitude and the system is thus prevented from responding to the effects of air turbulence.

When an intruder moves through the protected area the doppler signal which is fed into the amplifier exceeds the threshold value of the diodes 44 and 45. During the positive half-cycles of this doppler signal, the diode 44 conducts limiting the positive swing at the base of transistor 31 to 0.7 volts while the full signal swing is applied to transistor 30. Thus, the conduction of transistor 30 increases and the conduction of transistor 31 is limited. During the negative half-cycle of the doppler signal, the diode 45 conducts limiting the negative swing to minus 0.7 volts at the base of transistor 31, while the full signal swing is again applied to transistor 30.

Therefore, when an intruder is present, the amplifier operates in response to an input of the differential mode type wherein the transistors 30 and 31 are controlled by signals of unequal amplitude having the same phase.

The uneven conduction of the transistors creates a varying potential difference between the collectors thereof and current flows in the primary winding 39 of the transformer 37 producing an output signal in the secondary winding 40 which is fed into the detector 22. The detector 22 includes a diode 46 and a smoothing capacitor 47. The output signal of the amplifier 21 is half-wave rectified by the detector 22 and the successive pulses flow through a resistor 48 to charge a capacitor 49 in the integrator 24.

The voltage comparator 25 compares the charge on the capacitor 49 with a reference voltage. When the charge on the capacitor is less than the reference voltage, the voltage comparator applies a positive voltage to the alarm circuit 26. When a series of detector output pulses charge the capacitor to or above the reference voltage, the comparator responds and applies a negative voltage to the alarm circuit.

The alarm circuit includes a transistor 50, a relay 51 having a coil 52 and contacts 53, and an electrically operated alarm device 54 such as a lamp or bell. The transistor 50 has its base connected to the output of the comparator to be controlled thereby and has its collector-emitter circuit connected in series with the coil 52 between the terminals of a DC source. The alarm device 54 is connected in series with the contacts 53 across the terminals of a DC source.

The transistor 50 is normally held in conduction by the positive output voltage of the comparator. The relay 51 is thus normally energized and the contacts are open. When the capacitor 49 charges to the reference voltage, the transistor 50 is turned off and the contacts 53 close to actuate the alarm device.

The integrator 24 prevents the comparator from operating in response to a voltage spike at the output of the detector as a result in transient conditions such as water hammer in pipes or line voltage surges.

The constant current source 35 is utilized to minimize the effects of any mismatch in the two amplifying circuits of the amplifier 21, when operating in response to a common mode input. Since the current which the source 35 will provide is constant, changes in the resistance of the transistors collector-emitter circuits causes the voltage in the circuit to redistribute itself. The constant current source 35 appears as a very high resistance. When the resistance of each of the transistors is significantly reduced in response to a common mode signal, the voltage across the source 35 increases and the gain of the transistor is greatly reduced. Therefore, any signal which might appear across the collectors in response to a common mode signal would be of low level and would not actuate the alarm.

The presence of the constant current source 35 does not appreciably affect the gain of the transistors when the input is of the differential mode type. Then, the resistance of only one of the transistors is significantly reduced and the increase in voltage across the constant current source is much less.

While normal air turbulence produces doppler signals having the amplitude-frequency relationship shown in FIG. 2, it has been found that under some conditions the turbulence created by very large and powerful fans produce doppler signals which have a fairly constant amplitude-frequency relationship similar to that of the doppler signals produced by an intruder. The doppler signals produced by such fans are predominantly at an amplitude level which is considerably less than the amplitude of the intruder-produced signals. However, these signals experience random momentary high-amplitude swings which equal or exceed the amplitude which an intruder will produce. These high-amplitude swings sometimes occur singly and sometimes a number of them up to 5 or 10 will occur in quick succession. With the system shown in FIG. 1, if several of these high-amplitude swings occur within a short period of time, the capacitor 49 will charge up sufficiently to produce a false alarm.

FIG. 3 shows a modification of the system of FIG. 1 in which a feedback loop is provided between the output of the detector 22 and the diodes 44 and 45 to regulate the effective threshold value of the diodes 44 and 45 and thus control the magnitude of the differential mode input.

The feedback loop includes a resistor 56 and a diode 57 connected in series between the output of the detector 22 and electrical ground. In this embodiment, the diodes 44 and 45 are connected between the amplifier input and the junction point A of the resistor 56 and diode 57. All other portions of the system are identical to that shown and described in connection with FIG. 1.

The breakdown path to ground for the diodes 44 and 45 includes the parallel high-resistance paths through the capacitor 49, the capacitor 47, the diode 57, the diode 46, and through circuitry in the voltage comparator 25. The total resistance of these paths has the effect of increasing, to a degree, the signal level necessary to place the diodes 44 and 45 in conduction.

In operation, when turbulence from a very large and powerful fan is present, the sensitivity control 16 (FIG. 1) of the system is adjusted so that the predominate amplitude of the resulting doppler signals appearing at the inputs to the amplifier 21 are at a value somewhat below the threshold value of the diodes 44 and 45. As long as the turbulence-produced doppler signals remain at this level, the amplifier 21 produces no output. When a momentary high-amplitude swing occurs, the diodes 44 and 45 break down and the detector 22 produces an output which begins to charge the capacitor 49. The charge on the capacitor 49 at this point is not sufficient to break down the diode 57 and is far below the value which will operate the voltage comparator 25. The capacitor 49 tends to discharge through the resistor 56 and the diode 57. Since the diode has not reached its threshold value it exhibits a very high resistance and most of the charge on the capacitor is dropped across the diode. The junction point A is thus raised to a positive potential with respect to ground and the signal strength necessary to break down the diodes 44 and 45 is thereby increased.

If a single high-amplitude swing is received, the capacitor 49 has a chance to discharge before the next swing is received. However, if a series of high-amplitude signals are received in close time proximity, the capacitor 49 will not have a chance to discharge between signals. In that event, because the effective threshold level of the diodes is increased by the first swing, the second signal will produce a detector output of less amplitude than the first. The charge on the capacitor 49 will therefore increase, although not to the same extent as it did in response to the first swing, and the junction point A will become more positive further increasing the effective threshold level of the diodes. Succeeding high-amplitude swings occurring in close time proximity cause the effective threshold level of the diodes to further increase, at a decreasing rate, as the junction point A becomes more positive. The feedback loop thus retards the charging of the capacitor 49 is response to a series of high-amplitude input signals.

When an intruder is present, all of the received signals are of high amplitude and the capacitor 49 continues to charge. When the charge on the capacitor is sufficient, the diode 57 breaks down preventing any further increase in the effective threshold value of the diodes 44 and 45. The detector output for each succeeding input signal then remains constant and the capacitor 49 charges at a uniform rate up to the value which triggers the voltage comparator 25.

It will be seen from the foregoing that the present invention provides an improved ultrasonic intruder detector including simple, practical and economical means for eliminating the effects of air turbulence.

I claim:

1. Means for eliminating the effects of air turbulence in a detection system including means for radiating energy of a given frequency into a space to be modified in frequency by disturbances in the space, means for receiving frequency-modified energy reflected from objects within the space, and means for producing signals containing only frequencies equal to the difference between the frequency of the radiated energy and the frequencies of the received energy, comprising in combination filter means for eliminating those of said signals within a lower frequency range and passing those of said signals within a higher frequency range, means for adjusting the level of said higher frequency range signals resulting from air turbulence in the space to a value less than a predetermined level, and amplitude responsive means for producing an output to actuate an alarm only when said higher frequency signals have an amplitude above said predetermined level, said amplitude-responsive means includes a differential amplifier having a common mode input so as to produce no output in response to input signals, and means connected to said differential amplifier for causing said amplifier to produce an output when an input signal exceeds a predetermined value.

2. Apparatus according to claim 1 wherein said differential amplifier includes first and second input electrodes, a first resistor coupling said common mode input to said first input, a second resistor coupling said common mode input to said first and second resistors being equal in value so that no output is produced in response to signals at said common mode input, and means connected to said second input electrode to remove from said input any signals exceeding a predetermined amplitude whereby said amplifier produces an output in response to signals at said common mode input which exceed said amplitude.

3. Apparatus according to claim 2 wherein said last-mentioned means includes first and second diodes oppositely poled and connected between said second input electrode and electrical ground, said diodes having a threshold value equal to said predetermined amplitude.

4. Apparatus according to claim 3 including means for increasing the threshold value of said diodes up to a predetermined value in response to high-amplitude input signals to said differential amplifier to eliminate the effect of random high-amplitude doppler signals in said higher frequency range.

5. Apparatus according to claim 4 wherein rectifying means is connected to the output of said differential amplifier and said means for increasing the threshold value of said diodes includes a resistor and a third diode connected in series and connected to have the output of said rectifying means impressed there across, said third diode being connected between said oppositely poled diodes and electrical ground whereby the threshold value of said oppositely poled diodes is dependent upon the voltage dropped across said third diode.

6. Apparatus according to claim 1 wherein said amplitude-responsive means includes a differential amplifier having first and second amplifying sections having a common input and having their outputs balanced against each other and means responsive to the amplitude of the signals at said common input for unbalancing said amplifying sections when the amplitude of a signal at said common input exceeds said predetermined level.

7. Apparatus according to claim 1 means responsive to a signal of said common mode input having an amplitude above said predetermined level for causing said amplifier to operate in a differential mode input manner and produce an input.

* * * * *

UNITED STATES PATENT OFFICE
CERTIFICATE OF CORRECTION

Patent No. 3,629,812　　　　　Dated December 21, 1971

Inventor(s) Ernest J. Amato

It is certified that error appears in the above-identified patent and that said Letters Patent are hereby corrected as shown below:

Column 1, after line 71, insert

-- Fig. 3 is a schematic diagram of a feedback loop --.

Signed and sealed this 17th day of September 1974.

(SEAL)
Attest:

McCOY M. GIBSON JR.　　　　　C. MARSHALL DANN
Attesting Officer　　　　　　Commissioner of Patents